US008862884B2

(12) United States Patent
Hennebert

(10) Patent No.: US 8,862,884 B2
(45) Date of Patent: Oct. 14, 2014

(54) METHOD OF GENERATION OF A SECRET KEY FOR A WIRELESS COMMUNICATION SYSTEM

(75) Inventor: Christine Hennebert, La Tronche (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 133 days.

(21) Appl. No.: 13/482,306

(22) Filed: May 29, 2012

(65) Prior Publication Data

US 2012/0317417 A1    Dec. 13, 2012

(30) Foreign Application Priority Data

Jun. 7, 2011    (FR) ...................................... 11 54919

(51) Int. Cl.
*H04L 29/06*    (2006.01)
*H04L 9/32*    (2006.01)
*H04L 9/08*    (2006.01)

(52) U.S. Cl.
CPC ............ *H04L 9/0875* (2013.01); *H04L 9/0838* (2013.01); *H04L 2209/80* (2013.01)
USPC ........... 713/171; 713/168; 713/169; 713/170; 713/150

(58) Field of Classification Search
USPC .......................................... 713/150, 168–171
See application file for complete search history.

(56) References Cited

U.S. PATENT DOCUMENTS

| 2007/0036353 | A1 | 2/2007 | Reznik et al. |
| 2007/0165845 | A1 | 7/2007 | Ye et al. |
| 2007/0177729 | A1* | 8/2007 | Reznik et al. .................. 380/44 |
| 2011/0274277 | A1 | 11/2011 | Hennebert |

FOREIGN PATENT DOCUMENTS

| WO | WO 2006/081122 A2 | 8/2006 |
| WO | WO 2006/081306 A2 | 8/2006 |

OTHER PUBLICATIONS

Johnson, "4.2.3 Puncturing," Iterative Error Correction, Cambridge University Press, Nov. 2009, 2 pages.*
European Search Report issued Jun. 28, 2012, in Patent Application No. EP 12 17 0733.
Neal Patwari, et al., "High Rate Uncorrelated Bit Extraction for Shared Secret Key Generation from Channel Measurements", IEEE Transactions on Mobile Computing, vol. 9, No. 1, 2010, 15 pages.
Babak Azimi-Sadjadi, et al., "Robust Key Generation from Signal Envelopes in Wireless Networks", Proceedings of ACM Conference on Computer and Communications Security, 2007, pp. 401-410.
Takayuki Shimizu, et al., "Reliability-Based Sliced Error Correction in Secret Key Agreement from Fading Channel", IEEE Wireless Communications and Networking Conference, 2010, 6 pages.

* cited by examiner

*Primary Examiner* — Michael Simitoski
*Assistant Examiner* — John Elmore
(74) *Attorney, Agent, or Firm* — Oblon, Spivak, McClelland, Maier & Neustadt, L.L.P.

(57) ABSTRACT

The present invention concerns a method of generation of a secret key, shared between a first terminal and a second terminal. The key is generated from the impulse response of the transmission channel separating the two terminals. A first message representative of the impulse response estimated by the first terminal is transmitted to the second terminal. This message is encoded using a channel encoding and punctured at a rate which prevents any decoding if additional information is missing. The second terminal combines this first message with at least a part of a second message representative of the impulse response estimated by the second terminal in order to attempt to decode the first message. If the decoding is successful the secret key is generated by the second terminal from the first message thus decoded.

15 Claims, 5 Drawing Sheets

METHOD OF GENERATION OF A SECRET KEY FOR A WIRELESS COMMUNICATION SYSTEM

TECHNICAL FIELD

The present invention concerns generally the field of wireless communications, and more specifically that of wireless communications made secure by a secret key.

STATE OF THE PRIOR ART

Security of communications in wireless networks has been the subject of much research.

A first known securisation technique consists in encrypting the communications using a public key encryption, for example by means of the RSA algorithm, or of an elliptic curve cryptography algorithm. However, this technique requires that public keys of great length are exchanged in order that the encryption can resist possible attacks. In addition, the algorithms used are complex and use substantial computation resources, which are rarely available in mobile terminals.

Another known securisation technique consists in encrypting the communications using a secret key encryption, for example by means of the DES algorithm. The secret key must be shared between the issuing party (conventionally called Alice) and the receiving party (conventionally called Bob), and must not be able to be intercepted by a potential eavesdropper (conventionally called Eve). This technique however presumes a prior agreement between Bob and Alice concerning a secret key, which in practice is not always achievable. In addition, the secret key must be able to be renewed regularly, which supposes that the secret key can itself be transmitted securely.

It has recently been proposed to use the characteristics of the wireless transmission channel between the terminals of Bob and Alice, and to take advantage both of the reciprocity of the channel and of its high degree of spatial decorrelation. More specifically, the transmission channel's impulse response between Bob and Alice is theoretically identical, if noise is disregarded, to that of the transmission channel between Alice and Bob. Conversely, if Eve's terminal is located at more than half a wavelength from that of Bob, the transmission channel between Alice and Eve will have characteristics decorrelated from the one between Alice and Bob. Eve cannot therefore obtain the secret key simply by listening to the channel between Alice and Bob. Finally, the transmission channel between Alice and Bob is generally subject to time variations of its characteristics, notably when one or other of the parties moves. The secret key can thus be renewed frequently, without any need for an additional exchange over the transmission channel.

A description of a method of generation of a secret key from the characteristics of the transmission channel will be found in the article by N. Patwari et al. entitled "High rate uncorrelated bit extraction for shared secret key generation from channel measurements" published in IEEE Trans. on Mobile Computing, 2010, vol. 9, no 1, pp. 17-30.

One of the main difficulties with this method of generation of a secret key does however lie in the possible lack of an agreement between Bob and Alice concerning the generated key.

Indeed, firstly, the transmission channel between the two legitimate parties is not strictly identical due to the noise which affects it.

In addition, if the transmission is of the TDD (Time Division Duplex) type, it is possible that the characteristics of the transmission channel may have changed slightly between the instant of the measurement of the channel made by Bob and the instant of the measurement made by Alice. Similarly, if the transmission channel is of the FDD (Frequency Division Duplex) type, it is possible that the frequential characteristics of the transmission channel between Alice and Bob will not be identical to those of the reverse channel.

Due to the channel dissymmetry introduced by noise and/or the time/frequential shift mentioned above, the key generated by Bob is not necessarily identical to the one generated by Alice.

The article by B. Azimi-Sadjadi et al. entitled "Robust key generation from signal envelopes in wireless networks" published in Proceedings of ACM Conference on Computer and Communications Security 2007, pp. 401-410, proposed a number of measures to reach an agreement between the legitimate parties concerning the generated secret key, notably the use of a low-pass filter to reduce the noise before thresholding, followed by a fuzzy extractor.

The article by S. Takayuki et al. entitled "Reliability based sliced error correction in secret key agreement from fading channel" published in Proceedings of 2010 IEEE Wireless Communications and Networking Conference, proposes a method of smooth correction of transmission channel estimation errors starting with the low-order bits, and moving towards the high-order bits, in order to obtain a consensus estimate and, after this, a common secret key.

The methods of achieving a consensus concerning a common secret key described in the above-mentioned articles are, however, complex to implement and frequently require the channel estimate to be repeated on either side of this channel before a consensus is actually reached.

The purpose of the present invention is to propose a method of generation of a secret key from characteristics of the transmission channel which does not have the disadvantages of the prior art, and in particular which is robust with regard to noise, and easy to implement in a mobile terminal.

A subsidiary purpose of the present invention is to propose a method of generation of a secret key taking advantage of the HARQ type II (Hybrid Automatic ReQuest) protocol commonly used in the WiMax and 3G LTE (Long Term Evolution) standards.

ACCOUNT OF THE INVENTION

The present invention is defined by a method of generation of a secret key shared between a first terminal and a second terminal, where the said first and second terminals are connected by a wireless communication channel, where the first terminal makes a first estimate of the said channel and the second terminal makes a second estimate of the said channel, in which:

(a) a first message representing the first estimate is sent by the first terminal to the second terminal, where the said first message has been previously encoded using a channel encoding, and punctured with a first puncturing pattern, at a sufficiently high puncturing rate that it cannot be decoded;

(b) a second message representing the second estimate is stored by the second terminal, where the said second message has previously been encoded using the said channel encoding;

(c) at least a part of the second message is combined with the first message to decode the first message; and (d) if the decoding of the first message is successful the second terminal determines the secret code from the first message decoded in this fashion.

According to a first embodiment of the invention, if the decoding of the first message is successful the second terminal sends an acknowledgement to the first terminal, and the latter then determines the secret key from the said first message.

Advantageously, the first terminal determines the secret key by processing the first message, and the second terminal applies the same computation to the said first decoded message in order to obtain this key.

If the decoding of the first message is not successful the second estimate of the impulse response is shifted by at least one sample and steps (b), (c) and (d) above are repeated using the second estimate shifted in this manner.

The shifting of the second estimate of the impulse response and the sequence of steps (b), (c) and (d) can be iterated until the first message is successfully decoded, or until the shifting reaches a predetermined maximum value.

If the shifting reaches the said maximum value without the first message having been successfully decoded the second terminal sends the first terminal a request for transmission of a redundancy increment.

The redundancy increment can consist of bits which had been punctured by the first puncturing pattern.

In this case the following steps are advantageously made:

(c') the second terminal combines at least a part of the second message with the first message, previously completed by the said redundancy increment, and attempts to decode the first message from this combination;

(d) if the decoding of the first message is successful the second terminal determines the secret code from the first message decoded in this fashion.

Advantageously, the first terminal transmits the redundancy increment to the second terminal only if the first message completed by this redundancy increment is still undecodable.

If the new redundancy increment makes the first message decodable:

the said redundancy increment is not transmitted by the first terminal, and the latter makes this situation known to the second terminal;

the first and second terminals make, respectively, new first and second estimates of the transmission channel's impulse response.

According to a second embodiment, the second message previously encoded using the channel encoding is punctured with a second puncturing pattern, at a sufficiently high puncturing rate for it not to be able to be decoded, and the second message punctured in this manner is transmitted to the first terminal.

In this case the following steps are advantageously made by the first terminal:

the first terminal combines at least a part of the first message with the second message in order to decode the second message; and if the decoding of the second message is successful the first terminal determines the secret key from the second message decoded in this manner, provided it has not previously received an acknowledgement from the second terminal, and transmits an acknowledgement message to the second terminal;

the first terminal determines the secret key from the said first message, if it has received an acknowledgement message from the second terminal.

In a symmetrical manner, the following steps are advantageously made by the second terminal:

the second terminal combines at least a part of the second message with the first message in order to decode the first message; and if the decoding of the first message is successful the second terminal determines the secret key from the first message decoded in this manner, provided it has not previously received an acknowledgement from the first terminal, and transmits an acknowledgement message to the first terminal;

the second terminal determines the secret key from the said second message, if it has received an acknowledgement message from the first terminal.

A CRC can be computed and concatenated to the first/second message before channel encoding, puncturing and transmission by the first/second terminal, and the success of the decoding of the first/second message by the second/first terminal is determined by comparing the CRC computed using the first/second message received with the concatenated CRC.

Alternatively, a CRC is computed using the first/second message before channel encoding and puncturing, and then concatenated to the message punctured in this manner before transmission, and the success of the decoding of the first/second message is determined by comparing the CRC computed using the first/second message with the concatenated CRC.

BRIEF DESCRIPTION OF THE ILLUSTRATIONS

Other characteristics and advantages of the invention will appear on reading a preferential embodiment of the invention, made in reference to the attached figures, among which:

DETAILED ACCOUNT OF PARTICULAR EMBODIMENTS

In what follows we consider a system of wireless communication including at least a first terminal and a second terminal. By "terminal" we mean in this case an item of fixed or mobile communication equipment. The wireless communication system may or may not be cellular. It can notably be a mobile telephony network, an ad hoc network, a network of sensors, a network of communicating objects, etc. A terminal is taken to mean an item of communication equipment in the widest sense, for example a user terminal, a base station, a sensor, a communicating object, etc.

Communication between the first and second terminals uses a wireless transmission channel in all cases. Such a channel is generally selective in terms of time and/or frequency; in other words its impulse response has temporal and/or frequency fades. For example, the channel may be a channel with Rayleigh type fades when one or other of the channels is a mobile terminal.

Communication between the first and second terminal can be unidirectional or bidirectional. In the latter case communication in one direction uses transmission resources (transmission time intervals, frequencies, subcarrier intervals, orthogonal codes) different from those used by communication in the reverse direction. For example, in a TDD communication the transmission time intervals (TTI) differ in both directions; in the case of a FDD communication it is the transmission frequencies which differ.

As a consequence of the use of different transmission resources the transmission channel's characteristics can differ according to the transmission direction. In practice these characteristics do however differ relatively little, either because the time separation between the two transmission intervals is less than the channel's coherence time, or because the two transmission frequencies are adjacent.

Figure 1:
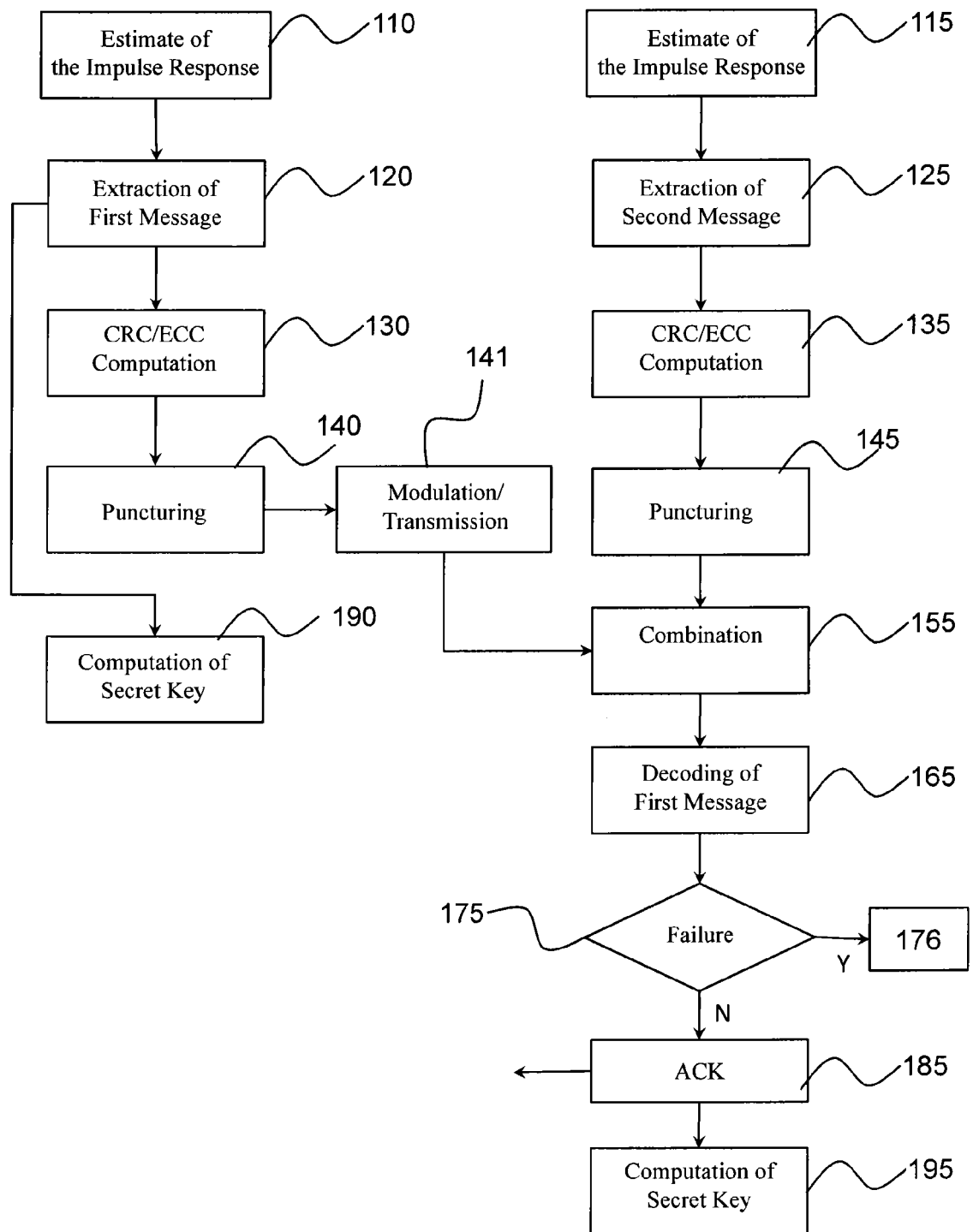
FIG. 1 represents schematically the method of generation of a secret key according to a first embodiment of the invention.

FIG. 1 represents schematically a method of generation of a secret key, shared by the first and second terminals of the wireless communication system.

In a first step, 110, the first terminal measures the transmission channel's impulse response, in a known manner. To accomplish this the second terminal sends a pilot symbols sequence. The pilot symbols sequence can be transmitted within a given transmission interval, or over several successive transmission intervals. An impulse response is taken to mean, in this case, either the impulse response in the strict sense, or simply the sequence received by the first terminal, i.e. the convolution of this impulse response with the pilot symbols sequence transmitted by the second terminal. The transmission channel's impulse response takes the form of a sequence of samples.

In the second step, 120, the first terminal processes the impulse response in order to extract from it a message representing this response, called below the first message. The processing can notably include a low-pass filter to eliminate noise, an automatic gain control (AGC), a quantification, an information compression, a Fourier transform, etc.

In step 130 the first terminal encodes the first message obtained in this manner using an Error Correcting Code, or ECC. Advantageously, the first message is firstly encoded using an error detection code, for example using a Cyclic Redundancy Check, or CRC. The ECC encoding can then relate to the original message concatenated to the CRC code. Alternatively, the ECC relates to the first message without a CRC, and the CRC is concatenated to the message obtained by ECC encoding.

The ECC encoding can be, for example, a coding of the Reed-Solomon type, a Low Density Parity Code, or LDPC, encoding, or turbo-coding.

In step 140 the first message encoded in this manner is punctured using a puncturing pattern having a sufficiently high puncturing rate to prevent it being decoded on reception. For example, if the encoding is of a systematic type, the systematic bits can all be punctured. Preferably only some of these will be punctured, but a sufficient number of them to exceed the correction capacity of the ECC code used. Thus, any spy terminal (Eve) intercepting the communication will be unable to reconstitute the original message.

The first message is modulated and then transmitted by the first terminal in 141. After reception the message is demodulated by the second terminal and depunctured. Depuncturing consists in processing the missing bits as deletions, in other words giving them a flexible value indicating an apparent absence of data (in practice, zero LLR).

Similarly, the second terminal makes an estimate of the transmission channel's impulse response in 115 (using a pilot symbol sequence transmitted by the first terminal, where the impulse response of the channel takes the form of a sequence of samples as in 110), a computation of this response in 125 in order to extract from it a second message representing this response, an error correction encoding, or ECC, in 135 (advantageously with CRC encoding prior to the ECC encoding). Steps 115, 125 and 135 undertaken by the second terminal are, respectively, identical to steps 110, 120 and 130 undertaken by the first terminal. In particular, the ECC encoding, and if applicable the CRC encoding, are identical to those used in 130. In addition, when a CRC encoding occurs prior to the ECC encoding in 130 the same CRC encoding is undertaken prior to the ECC encoding in 135. Conversely, when the CRC code is concatenated after the ECC code in 130, the CRC encoding is not necessary in 135. According to a variant, a step of puncturing 145 may be included. When this is present, the puncturing pattern used in 145 is advantageously separated from the one used in 140.

The second message generated in this manner is stored in the second terminal. In step 155 the second terminal combines at least a part of the second message with the first message received from the first terminal.

The first message consists of soft bits, typically in the form of probability ratio logarithms (LLRs). The second message also consists of soft bits but, unlike the first message, the positive and negative soft bits can be unvarying if the second message can be considered to be deterministic (no propagation over the transmission channel). In certain cases the second message can be encoded with "probabilistic" values. For example, if a bit represents the crossing of a predetermined threshold value, the soft value may represent the ratio between the original value and the threshold value. Thus, if the computation in 125 includes thresholding of the impulse response (to locate the fades), a soft value of the second message may be computed as the ratio between the amplitude (previously normalised) of the response with the threshold in question. Conversely, if a binary word of the second message (and of the first message) represents the temporal position of a fade, unvarying soft values will be used.

The first message is combined with at least a part of the second message as follows: If a bit is punctured both in the first message and in the second message, the bit resulting from the combination is a deletion (represented by an LLR of zero value). If a bit is punctured in the first message but is not punctured in the second message, the bit of the first message is replaced by the corresponding bit of the second message. In equivalent fashion, the value punctured in the first message (the punctured bit is equivalent to a deletion and therefore an LLR of zero value) is added to the value of the corresponding bit in the second message. Finally, if the bit is present in both messages the soft value of the first message is added to the soft value of the second message.

After the second message has been combined at least partly with the first message, a first attempt is made to decode the latter in 165.

It should be noted at this point that the only function of the second message is to assist with the decoding of the first message, and not the reverse. In other words, the information present in the second message simply enables the information missing in the first message due to the puncturing to be completed.

If the decoding fails in 165 (i.e. if the ECC code cannot correct the errors affecting the message), or again if the CRC computed from the decoded message indicates the presence of a residual error, as represented in test step 175, the algorithm continues in 176. Conversely, if the decoding is successful, with possible confirmation by computation of the CRC, an acknowledgement is transmitted to the first terminal in 185 and the secret key is computed in 195.

The secret key is obtained from the first message decoded in 165. It may be simply identical to the decoded message, or be the result of a sub-sampling of this message. Alternatively it can be extracted from this method by means of a computation intended to eliminate the redundancy from it, in other words by means of an information compression algorithm. For example, it may be obtained as the residue from filtering the first message decoded by means of a self-adaptive filter.

Simultaneously, if the first terminal receives a decoding acknowledgement, it generates the secret key in 190 from the first original message (as obtained in 120) by means of a computation identical to the one applied to the first message decoded in 195. The secret key generated in this manner is therefore common to both terminals and can be used to encrypt a communication using a symmetrical cryptography algorithm such as, for example, 3DES or RC4.

If required, the secret key can be renewed using the same method of generation. The characteristics of the transmission channel generally vary over time, either due to a relative movement of the two terminals, or due to a change in their environment, and the new key obtained in this manner is decorrelated from the previous one.

Figure 2:
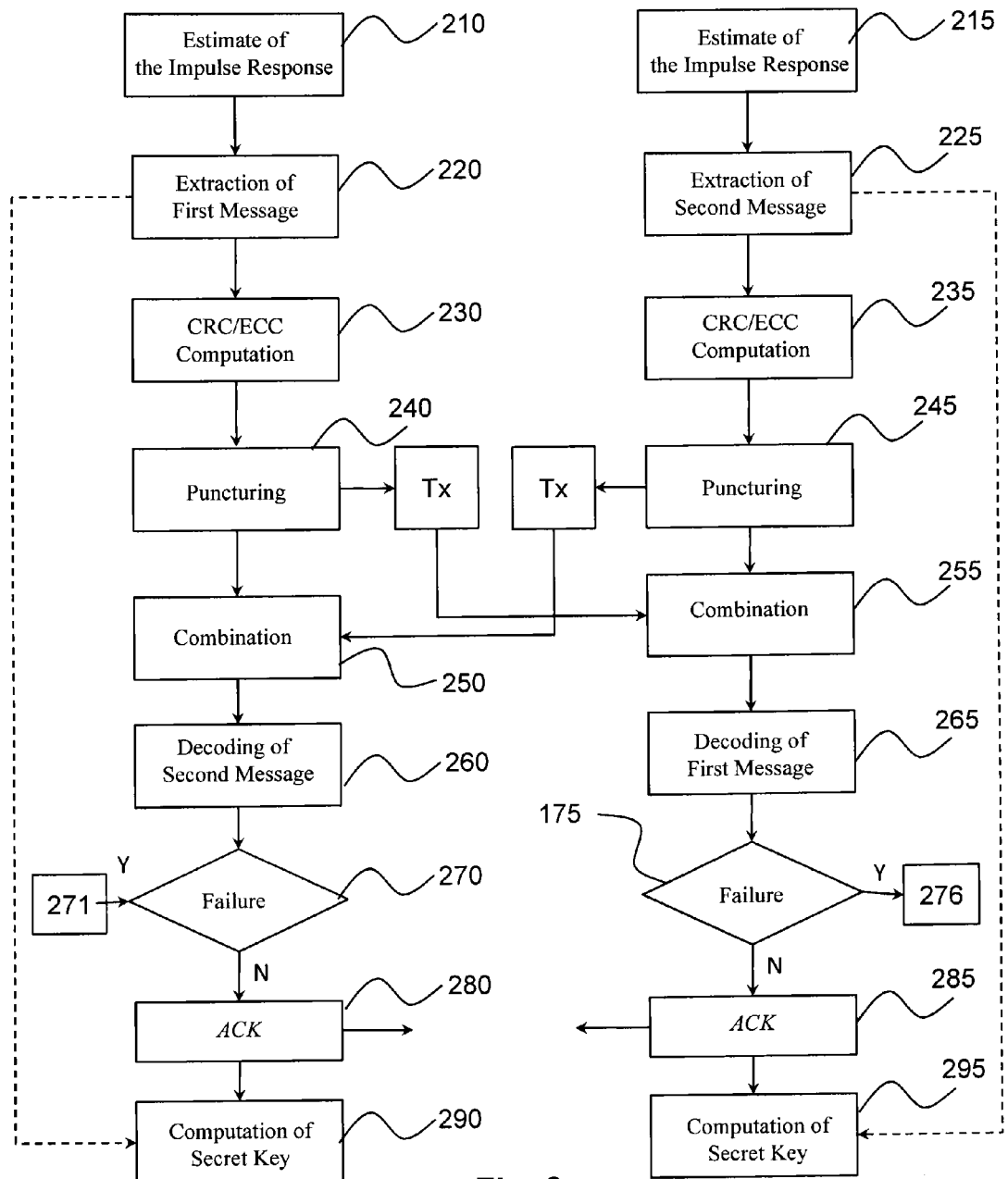
FIG. 2 represents schematically the method of generation of a secret key according to a second embodiment of the invention.

FIG. 2 represents schematically a second embodiment of the method of generation of a secret key according to the invention.

Unlike the first embodiment, the second message is transmitted by the second terminal to the first terminal in order to determine a joint secret key.

Steps 210, 220, 240 and 241 undertaken by the first terminal are respectively identical to steps 110, 120, 130 and 141 of FIG. 1 and will not therefore be described again here. In a similar manner, steps 215, 225, 235, 245, 255, 265, 275-276, 285 and 295 are respectively identical to steps 115, 125, 135, 145, 165, 175-176, 185 and 195.

The secret key obtained in step 295 is called the first secret key in the second embodiment.

In addition, step 145 of puncturing is in this case not optional, and the puncturing pattern applied to it has a sufficiently high puncturing rate that the second punctured message cannot be decoded by a receiver. A third terminal intercepting the communication between the second terminal and the first terminal would thus be unable to obtain the second original message. It is also recalled that the puncturing pattern used to puncture the second message is preferably separate from the one used to puncture the first message.

After puncturing, the second message is modulated and transmitted by the second terminal over the transmission channel. This message is received by the first terminal, demodulated and depunctured, as explained above.

The first message obtained in 220 is then combined at least partly in 250 with the second message depunctured in this manner. The combination is accomplished symmetrically with the one accomplished in 255. In particular, the information missing in the second message is completed by that contained in the first message.

After the combination a first attempt to decode the second message is made in 260. If it is detected in 270 that the decoding is failing, due to a correction incapacity of the ECC code, or due to the detection of a residual error in the decoded message by means of the CRC (when the latter is present) the method of generation continues in step 271.

Conversely, if the decoding is successful, with possible confirmation by computation of the CRC, an acknowledgement is transmitted to the second terminal in 280 and the secret key is computed in 290.

The common secret key is obtained by competition between the computation of the first secret key and of the second secret key. More specifically, the terminal which first receives an acknowledgement from the other terminal interrupts the decoding of the received message (first or second message, as applicable), and then generates locally the joint secret key from the original message, as was explained in step 190.

More specifically, if the decoding of the first message is faster than that of the second message, the acknowledgement transmitted in 285 will interrupt the process of decoding of the second message in the first terminal. The latter will then generate the common key from the first original message (as obtained in 220), as represented by the dotted arrow in the left-hand part of the figure.

In a symmetrical manner, if the decoding of the second message is faster than that of the first message, the acknowledgement transmitted in 280 will interrupt the process of decoding of the first message in the second terminal. The latter will then generate the common key from the second original message (as obtained in 225), as represented by the dotted arrow in the right-hand part of the figure.

Thus, as soon as the decoding of the first message or second message is successful a common secret key is obtained. Communication between the two terminals can then be encrypted by means of a symmetrical cryptography algorithm, as stated above.

A spy terminal (Eve) intercepting the first or second message would be unable to decode it. In addition, if it tried to complete the information received in the intercepted message from its own measurement of the transmission channel's impulse response in order to decode the message, this decoding would be doomed to failure since the transmission channel between the first/second terminal and the spy terminal would necessarily have a response different from the one of the channel separating the first and second terminals.

Figure 3:
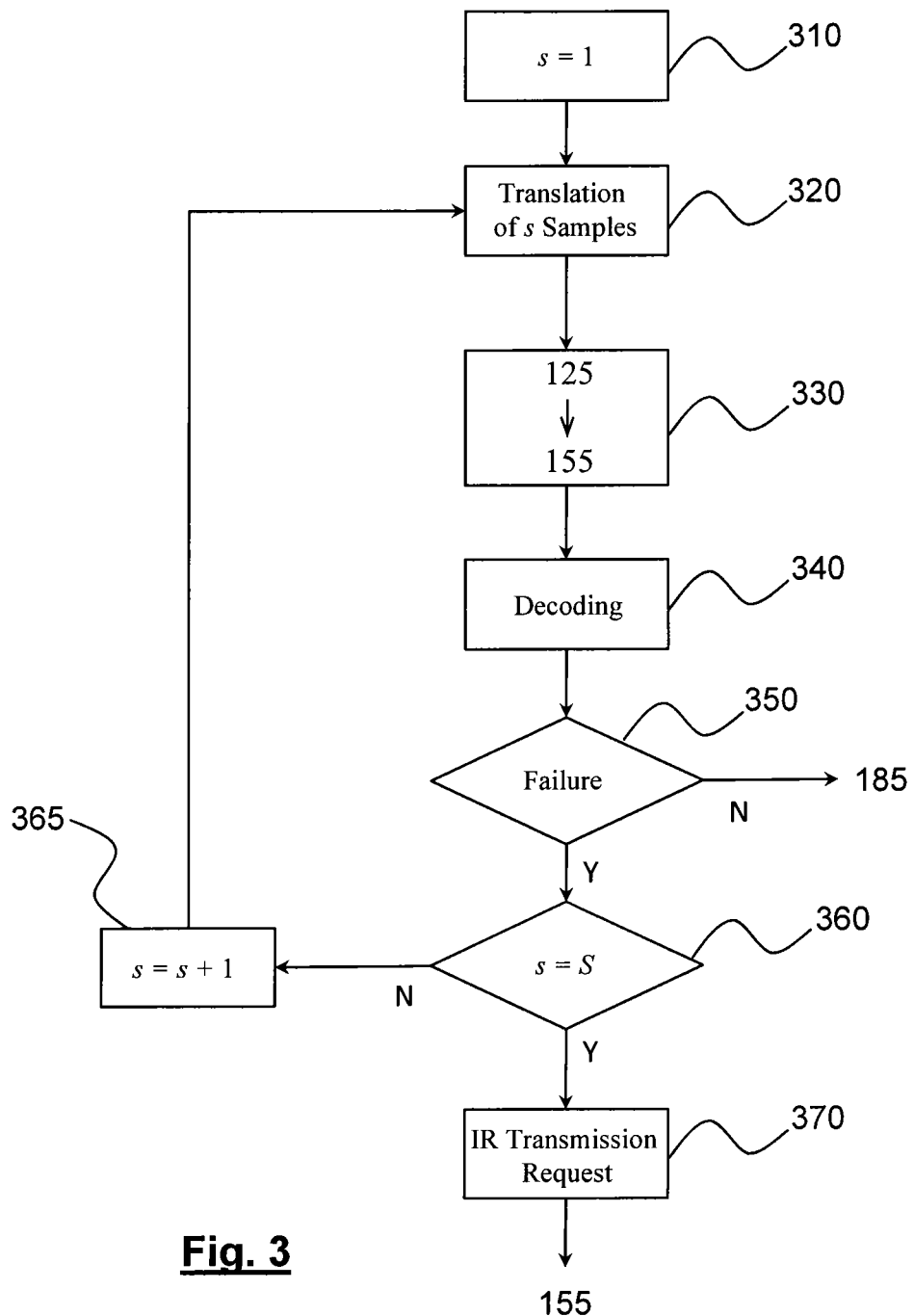
FIG. 3 represents schematically the hypothesis of a failed decoding of a message received in FIG. 1 or FIG. 2.

When the decoding of the first message fails in 175 or 275, or again when the decoding of the second message fails in 270, the method of generation of a secret key continues as indicated in FIG. 3.

FIG. 3 represents schematically the sequence of the method of generation of a secret key in the event of failure of the decoding of a message in FIG. 1 (cf. step 176) or FIG. 2 (cf. step 271 or 276).

We shall suppose below, as an illustration, that the decoding of the first message has failed in 175, in the first embodiment. It is however clear that if the decoding of the first message fails in 275, or of the second message fails in 270, in the second embodiment, a similar procedure would be followed.

Firstly, if the number of errors exceeds the correction capacity of the ECC code, or if the CRC computed from the decoded message indicates the presence of an error, a test is made as to whether the origin of these errors is due to a shift of the impulse response, as estimated in 115, compared to the one estimated in 110. Indeed, it is possible that a time lag (TDD) or frequency shift (FDD) between the two connection directions leads to a shift of a few samples of the transmission channel's impulse response.

If the maximum shift tolerated between the two estimated impulse responses in 110 and 115 is noted as s, a check is made as to whether a translation of $s=1, \ldots, S$ samples from the second impulse response compared to the first enables the first message to be corrected.

To accomplish this, the shift is firstly initialised in 310 to $s=1$ sample, and the second impulse response of s sample(s) is translated in 320. Steps 125 to 155 are made again in 330 using the impulse response translated in this manner.

A new decoding is attempted in 340. As represented in 350, if the decoding is successful one returns to step 185 (FIG. 1); in other words an acknowledgement of decoding is transmitted to the first terminal and the secret key is computed in 195. Conversely, if the decoding fails again, a test is made in 360 as to whether s=S.

If this is not the case, the shift is incremented in 365 and one returns to step 320 for a new translation and a new decoding attempt using the translated impulse response, 330 and 340.

Conversely, if s=S, but if the decoding is still not successful, the second terminal resets the shift to zero (s=0) and in 370 sends a request to the first terminal for it to transmit a new redundancy increment. This redundancy increment consists of multiple bits eliminated during puncturing step 140. The skilled man in the art will understand that the transmission of successive redundancy increments will not require any substantial modification of the terminal if the latter is capable of operating according to the HARQ type II protocol.

Before acceding to the abovementioned request, the first terminal checks that the collection constituted by the first message sent and the requested redundancy increment still prevents the first original message from being decoded. If this is not the case it does not send this increment and, if applicable, notifies the second terminal of this.

The method continues by returning to step 155, in which at least a part of the second message is combined with the first message completed by the redundancy increment. If the decoding fails once again, the impulse response measured in 115 is shifted by successive shifts until the decoding succeeds, or until the maximum shift value s=S is once again obtained. In the latter case the second terminal transmits a new request for a transmission of a redundancy increment, and the new combination made in 155 relates to the first message completed by the successive redundancy increments.

Seen from the first terminal, a new redundancy increment is transmitted each time a request is received, provided however that the first message punctured and completed by the successive increments remains undecodable. It will thus be understood that a third terminal, intercepting the punctured version of this message and the successive redundancy increments, will not be able to generate the secret key. If the transmission of a new increment enables the first message to be decoded (with the understanding that there will be no additional information, such as that provided by the second message), the new increment is not transmitted and the method of generation of a secret key starts again from the beginning with the estimate of the transmission channel's impulse response by the first terminal in 110 and the second terminal in 115.

Figure 4:
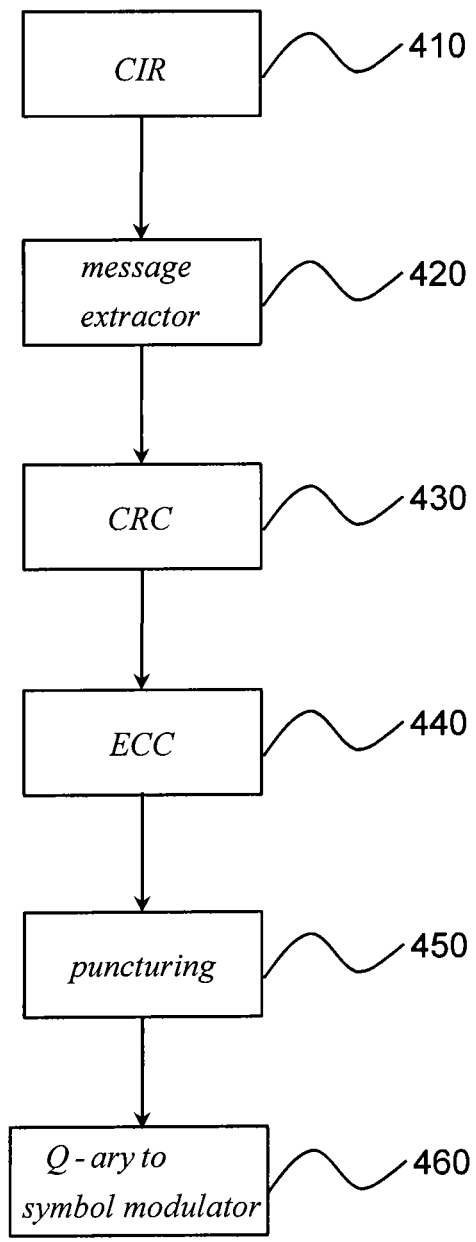
FIG. 4 represents schematically an example implementation of the method of generation of a secret key in a transmitting terminal.

FIG. 4 represents schematically an example implementation of the method of generation of a secret key in the first terminal, in this case playing the role of transmitting terminal.

The terminal in question includes a module for estimating the transmission channel's impulse response, 410. As previously mentioned above, it is possible that the impulse response is not deconvoluted, in other words it may represent the response of the channel to a pilot symbols sequence.

Computation module 420 transforms the impulse response into a message representing it.

The message can optionally form have an error check code (CRC) applied to it in 430, where the CRC is then concatenated to the message, in a known manner.

The message and, if applicable, its concatenated CRC, is encoded using an error correcting code (ECC) in encoding module 440. The message encoded in this manner is punctured by puncturing module 450. The punctured bits are stored in a memory 455 and can be transmitted in packets (redundancy increments) on request.

Finally, the punctured message is modulated by a symbol Q-area modulator 460 before being transmitted over the transmission channel.

The terminal also includes a computation module 470 determining a secret key from the message supplied by computation module 420.

Figure 5:
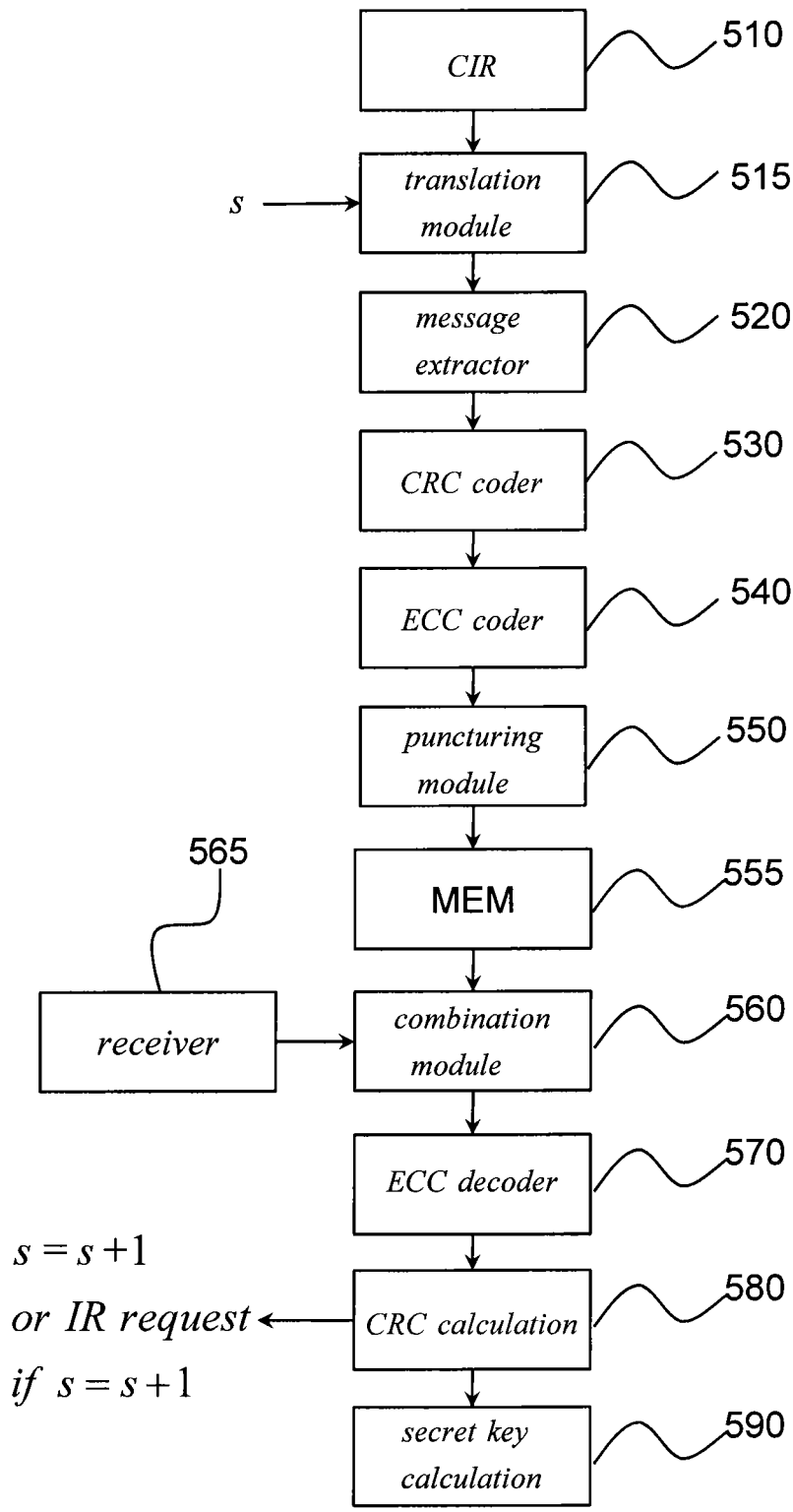
FIG. 5 represents schematically an example implementation of the method of generation of a secret key in a receiver terminal.

FIG. 5 represents schematically an example implementation of the method of generation of a secret key in the second terminal, in this case playing the role of receiver terminal.

The first terminal includes a module for estimating an impulse response, 510, a computation module 520, an optional module for computing the CRC, 530, an ECC encoding module, 540, and a puncturing module 550. Modules 510-540 are respectively identical to modules 410-440, except that the puncturing pattern used in 550 is separate from the one used in 450. In addition, a translation module 515 is placed between estimation module 510 and computation module 520. This module translates the estimated impulse response of s samples. With each new estimate, shift value s is reset to zero.

The sequence of bits forming the second message is stored in 555. It is combined at least partly in 560 with the first message received from the first terminal by receiver 565. The combination module performs, for example, an addition of the LLRs as explained above.

Finally, the message resulting from the combination has ECC decoding applied to it in 570 and a CRC computation applied to it in 580. If the message is decodable, and if the CRC is identical to the concatenated one, computation module 590 determines the secret key from the decoded message. Conversely, if the message cannot be decoded, or if the computed CRC is incorrect, the shift value input into module 515 is incremented. The method of generation continues in 520 using the translated impulse response. If the incremented shift value exceeds maximum shift S, a request for transmission of a redundancy increment is sent to the first terminal. The redundancy increment is combined with the said part of the second message in 560.

The skilled man in the art will understand that the method of generation of a secret key according to the invention uses modules which are generally implemented in a wireless terminal implementing a type II HARQ (IR-HARQ) transmission protocol. It can therefore be used without great difficulty in existing terminals.

The invention claimed is:

1. A method of generation of a secret key shared between a first terminal and a second terminal, where said first and second terminals are connected by a wireless communication channel, and where the first terminal makes a first estimate of an impulse response of said wireless communication channel and the second terminal makes a second estimate of the impulse response of said wireless communication channel, comprising:
(a) a first message representing the first estimate is sent by the first terminal to the second terminal, where said first message has been previously encoded using a channel encoding, and punctured with a first puncturing pattern, at a sufficiently high puncturing rate higher than a threshold puncturing rate that exceeds a correction capability of said channel encoding;

(b) a second message representing the second estimate is stored by the second terminal, where said second message has previously been encoded using said channel encoding;

(c) said second message is combined with the first message to decode the first message; and (d) the second terminal determines the secret key from the decoded first message upon determining that the decoding of the first message is successful.

2. The method of generation of a secret key according to claim 1, wherein if the decoding of the first message is successful, the second terminal sends an acknowledgement to the first terminal, and the latter then determines the secret key from said first message.

3. The method of generation of a secret key according to claim 2, wherein the first terminal determines the secret key by applying a computation to the first message, and wherein the second terminal applies said computation to said first decoded message to obtain said secret key.

4. The method of generation of a secret key according to claim 1, wherein the first and second estimates of the impulse response of said wireless communication channel take the form of a sequence of samples, and wherein, if the decoding of the first message is not successful, the second estimate is shifted by at least one sample compared to the first, and wherein steps (b), (c) and (d) are repeated using the second estimate thus shifted.

5. The method of generation of a secret key according to claim 4, wherein a shift of the second estimate and the sequence of steps (b), (c) and (d) is iterated until the first message is successfully decoded, or until the shift reaches a predetermined maximum value.

6. The method of generation of a secret key according to claim 5, wherein if the shift reaches said maximum value without the first message having been successfully decoded, the second terminal sends the first terminal a request for transmission of a redundancy increment.

7. The method of generation of a secret key according to claim 6, wherein the redundancy increment includes bits which had been punctured by the first puncturing pattern.

8. The method of generation of a secret key according to claim 7, wherein (c') the second terminal combines at least a part of the second message with the first message, previously completed by said redundancy increment, and attempts to decode the first message from this combination; and (d) if the decoding of the first message is successful, the second terminal determines the secret code from the first message thus decoded.

9. The method of generation of a secret key according to claim 8, wherein the first terminal transmits the redundancy increment to the second terminal only if the first message completed by this redundancy increment is still undecodable.

10. The method of generation of a secret key according to claim 9, wherein if the new redundancy increment makes the first message decodable:

said redundancy increment is not transmitted by the first terminal, and the latter makes this situation known to the second terminal; and the first and second terminals make, respectively, new first and second estimates of the impulse response of said wireless communication channel.

11. The method of generation of a secret key according to claim 1, wherein the second message previously encoded using the channel encoding is punctured with a second puncturing pattern, at a puncturing rate higher than the threshold puncturing rate, and wherein the second message punctured with said second puncturing pattern is transmitted to the first terminal.

12. The method of generation of a secret key according to claim 11, wherein:

the first terminal combines at least a part of the first message with the second message in order to decode the second message;

if the decoding of the second message is successful, the first terminal determines the secret key from the second message thus decoded, provided said first terminal has not previously received an acknowledgement from the second terminal, and transmits an acknowledgement message to the second terminal; and the first terminal determines the secret key from said first message, if the first terminal has received an acknowledgement message from the second terminal.

13. The method of generation of a secret key according to claim 11, wherein:

the second terminal combines at least a part of the second message with the first message in order to decode the first message;

if the decoding of the first message is successful, the second terminal determines the secret key from the first message decoded in this manner, provided the second terminal has not previously received an acknowledgement from the first terminal, and transmits an acknowledgement message to the first terminal; and the second terminal determines the secret key from said second message, if the second terminal has received an acknowledgement message from the first terminal.

14. The method of generation of a secret key according to claim 11, wherein a CRC is computed and concatenated to the first/second message before channel encoding, puncturing and transmission by the first/second terminal, and wherein the success of the decoding of the first/second message by the second/first terminal is determined by comparing the CRC computed using the first/second message received with the concatenated CRC.

15. The method of generation of a secret key according to claim 11, wherein a CRC is computed using the first/second message before channel encoding and puncturing, and then concatenated to the punctured message before transmission, and wherein the success of the decoding of the first/second message is determined by comparing the CRC computed using the first/second message with the concatenated CRC.

* * * * *